US011577129B2

(12) United States Patent
Refaeli

(10) Patent No.: US 11,577,129 B2
(45) Date of Patent: Feb. 14, 2023

(54) BALL COLLECTION APPARATUS AND METHOD

(71) Applicant: Nir Refaeli, Kiryat Ono (IL)

(72) Inventor: Nir Refaeli, Kiryat Ono (IL)

( * ) Notice: Subject to any disclaimer, the term of this patent is extended or adjusted under 35 U.S.C. 154(b) by 626 days.

(21) Appl. No.: 16/607,114

(22) PCT Filed: Apr. 26, 2018

(86) PCT No.: PCT/IL2018/050462
§ 371 (c)(1),
(2) Date: Oct. 22, 2019

(87) PCT Pub. No.: WO2018/198122
PCT Pub. Date: Nov. 1, 2018

(65) Prior Publication Data
US 2020/0298067 A1    Sep. 24, 2020

Related U.S. Application Data

(60) Provisional application No. 62/490,880, filed on Apr. 27, 2017.

(51) Int. Cl.
*A63B 47/02*        (2006.01)
*A63B 65/12*        (2006.01)
*A63B 102/02*       (2015.01)

(52) U.S. Cl.
CPC ............ *A63B 47/021* (2013.01); *A63B 65/12* (2013.01); *A63B 2047/022* (2013.01);
(Continued)

(58) Field of Classification Search
CPC . A63B 47/021; A63B 65/12; A63B 2047/022; A63B 2102/02;
(Continued)

(56) References Cited

U.S. PATENT DOCUMENTS 2,729,046 A * 1/1956 Patterson ............. A63B 47/021
414/440
3,102,647 A * 9/1963 Bonney ................ A63B 47/021
414/440
(Continued)

FOREIGN PATENT DOCUMENTS

CN    108905110 A * 11/2018 ........... A63B 47/021
DE   102015005825 A1   10/2016
(Continued)

OTHER PUBLICATIONS

International Search Report for PCT application PCT/IL2018/050462 issued by the USPTO dated Aug. 27, 2018.
(Continued)

*Primary Examiner* — Jeffrey S Vanderveen
(74) *Attorney, Agent, or Firm* — Webb and Co., Ltd.

(57) ABSTRACT

A ball collection apparatus constituted of: a control circuitry; a body; motors; wheels arranged to rotate responsive to the motors, the body arranged to move along a surface responsive to the rotation of the plurality of wheels; a collection compartment arranged to maintain a ball within a predetermined area in relation to the body; a ball input port in communication with the collection compartment; and a ball ejector arranged to eject the ball from the collection compartment, wherein the control circuitry is arranged to: receive information regarding the location of the ball; responsive to the received information, control the at least one motor to advance the body towards the location of the ball, the collection compartment arranged to collect the ball through the ball input port; and control the ball ejector to eject the ball from the collection compartment and propel the ejected ball towards a predetermined target area.

7 Claims, 8 Drawing Sheets

(52) U.S. Cl.
CPC ..... *A63B 2102/02* (2015.10); *A63B 2220/805* (2013.01); *A63B 2220/807* (2013.01)

(58) Field of Classification Search
CPC ........ A63B 2220/805; A63B 2220/807; A63B 2071/025; A63B 2220/806; A63B 69/38; A63B 69/406; A63B 2225/50; A63B 47/002
See application file for complete search history.

(56) References Cited

U.S. PATENT DOCUMENTS

| | | | | |
|---|---|---|---|---|
| 4,077,533 | A * | 3/1978 | Meyer | A63B 47/021 414/440 |
| 4,116,436 | A * | 9/1978 | Bjorhn | A63B 47/024 473/460 |
| 6,212,799 | B1 * | 4/2001 | Gingerich | F41H 11/18 37/246 |
| 9,039,547 | B2 * | 5/2015 | Yeager | G09B 19/0038 473/422 |
| 9,089,742 | B2 * | 7/2015 | Vilar | A63B 47/021 |
| 10,589,152 | B2 * | 3/2020 | Askenazi | A63B 47/002 |
| 2002/0148455 | A1 * | 10/2002 | Trajkovic | A63B 65/12 124/78 |
| 2006/0137672 | A1 * | 6/2006 | Smith | A63B 69/406 124/78 |
| 2006/0180513 | A1 * | 8/2006 | Mang | A01D 51/002 209/420 |
| 2009/0137348 | A1 * | 5/2009 | Tsai | A63B 47/021 473/436 |
| 2013/0064631 | A1 * | 3/2013 | Leyco | A63B 47/021 414/439 |
| 2015/0328503 | A1 * | 11/2015 | Vilar | A63B 47/021 473/460 |
| 2016/0243970 | A1 * | 8/2016 | Eletrabi | B60P 1/00 |
| 2016/0310817 | A1 * | 10/2016 | Yeager | A63B 69/406 |

FOREIGN PATENT DOCUMENTS

| | | | | |
|---|---|---|---|---|
| EP | 2343106 | A2 * | 7/2011 | .......... A63B 47/021 |
| EP | 2343106 | A2 | 7/2011 | |
| EP | 3335550 | A1 * | 6/2018 | ............. A01K 15/02 |
| ES | 2832600 | A1 * | 6/2021 | .......... A63B 69/002 |
| FR | 2510285 | A1 * | 7/1981 | |
| FR | 2510285 | | 1/1983 | |

OTHER PUBLICATIONS

Written Opinion of the International Search Report for PCT application PCT/IL2018/050462 issued by the USPTO dated Aug. 27, 2018.

* cited by examiner

BALL COLLECTION APPARATUS AND METHOD

CROSS-REFERENCE TO RELATED APPLICATIONS

This application claims priority from U.S. provisional patent application Ser. No. 62/490,880, filed Apr. 27, 2017 and entitled "System and method for automated balls collection during game or practice", the entire contents of which are incorporated herein by reference.

TECHNICAL FIELD

The invention relates generally to the field of sports equipment and in particular to a robotic device arranged to collect balls and propel the collected balls towards a predetermined target area.

BACKGROUND

This invention relates in general to the need of collecting balls scattered around a large size court in a ball game or practice. One particular, non-limiting example of such a ball game is tennis—for which the following description and embodiments will relate to in details, but this invention is relevant and includes also other sports involving balls scattered around during a game or practice.

Tennis in particular is a leading example of a sport involving a large size court, wherein a large number of balls become scattered around the court during the game or practice. The problem of tennis ball scattered around the court can be divided into two distinct scenarios: during a tennis game, where few balls are scattered about the court and during tennis practice, where a large number of tennis balls may be scattered about the court.

In both scenarios, there is a need to collect the balls automatically: firstly since the balls interfere with the course of the game or practice, and can even cause injuries if stumbled upon; and secondly since in the absence of automated ball retrieval the game or practice must be stopped when the available stock of balls is exhausted. This especially problematic during the game, where an average of only 3-6 balls are in use by the players.

The prior art does not provide a solution for the problem of collecting the scattered balls during the game. Rather, the prior art demonstrates a number of solutions for collecting the balls during a break in practice, typically caused by exhaustion of the available stock of balls. For example, U.S. Pat. No. 4,077,533 issued Mar. 7, 1978 to Meyer, the entire contents of which are in incorporated herein by reference, is addressed to a tennis ball retrieving device which utilizes a rotary drum for retrieving balls. U.S. Patent Application Publication S/N 2016/0243970 published Aug. 25, 2016 to Eletrabi, the entire contents of which are incorporated herein by reference, is addressed to a dual function robot and storage bin teaches a means for automatically finding and collecting balls, however such a device is intrusive and requires a significant amount of time to collect the balls and return same to the players which makes it suitable only for collecting large amount of balls after a practice session and is not intended and not practical for use during the game.

German Patent Application Publication S/N DE102015005825A1 published Nov. 10, 2016, the entire contents of which are incorporated herein by reference, attempts to solve the problem of retrieving balls to the players during the game. Unfortunately, the method taught takes a lot of time to retrieve each ball, it doesn't solve the problem of retrieving a few scattered balls during the game and it involves robot/s that moves along the court lines during the game which will disturb many of the players. Thus, this solution is not practical for this problem.

Thus there is a long felt need for a fast, small and affordable solution for retrieval and return of the balls to the players during a tennis game without interfering in the course of the game.

SUMMARY OF THE INVENTION

Accordingly, it is a principal object of the present invention to overcome at least some of the disadvantages of the prior art. This is provided in the present embodiments by a ball collection apparatus comprising: a control circuitry; a body; at least one motor; a plurality of wheels arranged to rotate responsive to the at least one motor, the body arranged to move along a surface responsive to the rotation of the plurality of wheels; a collection compartment arranged to maintain a ball within a predetermined area in relation to the body; a ball input port in communication with the collection compartment; and a ball ejector arranged to eject the ball from the collection compartment, wherein the control circuitry is arranged to: receive information regarding the location of the ball; responsive to the received information, control the at least one motor to advance the body towards the location of the ball, the collection compartment arranged to collect the ball through the ball input port; and control the ball ejector to eject the ball from the collection compartment and propel the ejected ball towards a predetermined target area.

In one embodiment, the propelling of the ball is at a velocity of at least 1.5 meters/second towards the predetermined target area. In another embodiment, the ball collection apparatus further comprises an imaging sensor arranged to image a predefined imaging area in relation to the body, the imaging sensor secured to the body and in communication with the control circuitry, the received information comprises the image, wherein the control circuitry is arranged to identify within the imaged area the locations of: the ball; and one of a net, a net pole, a court line and a player, wherein the advancement towards the ball is responsive to the identified locations.

In one embodiment, the ball collection apparatus further comprises a generally cylindrical shaped rotation member positioned within the ball input port, the generally cylindrical shaped rotation member arranged to rotate responsive to the at least one motor, wherein the control circuitry is arranged to control the at least one motor to rotate the generally cylindrical shaped rotation member in a first direction to insert the ball into the collection compartment. In one further embodiment, the ball ejector comprises the generally cylindrical shaped rotation member, wherein the arrangement of the control circuitry to control the ball ejector to eject the collected ball and propel the ejected ball towards the predetermined target area comprises controlling the at least one motor to rotate the generally cylindrical shaped rotation member in a second direction, the second direction opposing the first direction.

In another further embodiment, the at least one motor comprising a plurality of motors, a first of the plurality of motors arranged to rotate the generally cylindrical shaped rotation member, and wherein the first of the plurality of motors is positioned within the cylindrical shaped rotation member.

In one embodiment, the collection compartment comprises a curved cage secured in relation to the body and arranged to drive the collected ball towards the predetermined area. In another embodiment, the predetermined target area is a predetermined point on a playing court.

In one embodiment, the control circuitry is further arranged to identify the location of a player, the predetermined target area being the identified player location. In another embodiment, the control circuitry initiates the advancement of the body towards the location of the ball responsive to a predetermined input signal.

In one independent embodiment, a ball collection method is provided, the method comprising: receiving information regarding the location of a ball; responsive to the received information, advancing a collection compartment towards the location of the ball; collect the ball in the advanced collection compartment; ejecting the ball from the collection compartment and propelling the ejected ball towards a predetermined target area.

In one embodiment, the propelling is a continuation of the ejecting. In another embodiment, the propelling of the ball is at a velocity of at least 1.5 meters/second towards the predetermined target area.

In one embodiment, the method further comprises imaging a predefined imaging area in relation to the collection compartment, the received information comprising the image; and identifying within the imaged area the locations of: the ball; and one of a net, a net pole, a court line and a player, wherein the advancement towards the ball is responsive to the identified locations. In another embodiment, the method further comprises rotating a generally cylindrical shaped rotation member in a first direction to insert the ball into the collection compartment. In one further embodiment, the method further comprises rotating the generally cylindrical shaped rotation member in a second direction, the second direction opposing the first direction, wherein ejection is responsive to the rotation in the second direction.

In one embodiment, the predetermined target area is a predetermined point on a playing court. In another embodiment, the method further comprises identifying the location of a player, the predetermined target area being the identified player location. In another embodiment, in a game play mode, the method further comprises initiating the advancement towards the location of the ball responsive to a predetermined input signal.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how several forms of the invention may be embodied in practice. In the accompanying drawings.

DETAILED DESCRIPTION OF THE PREFERRED EMBODIMENTS

Figure 1A:
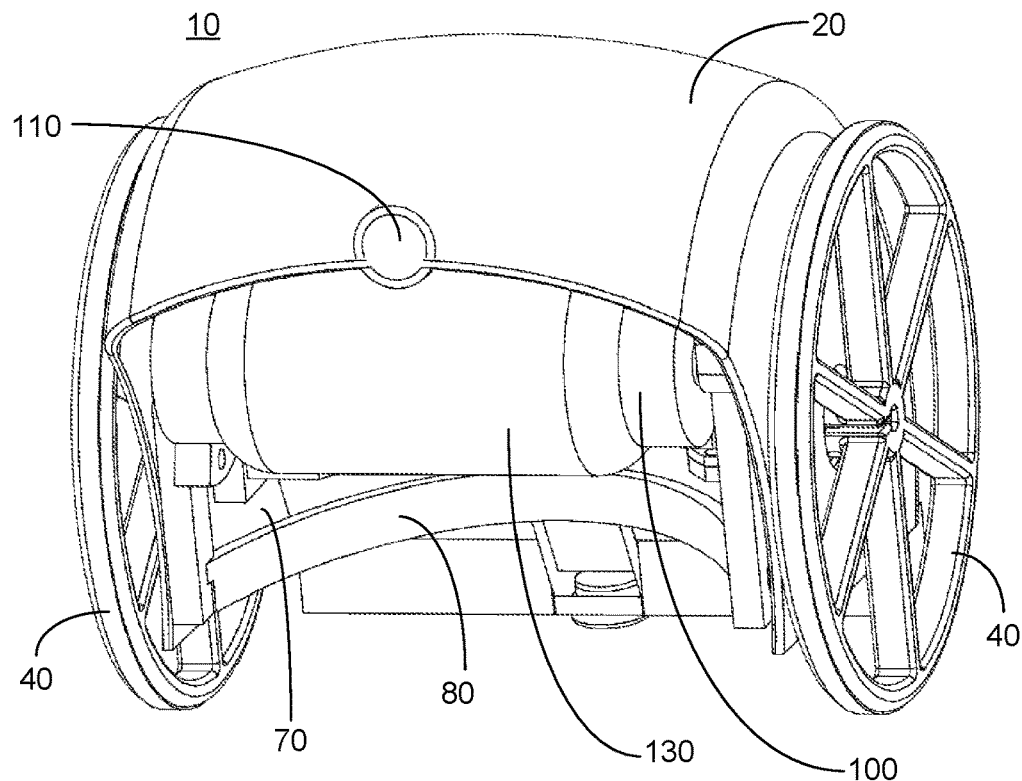
FIGS. 1A-1G illustrate various high level views of a ball collection apparatus, in accordance with certain embodiments.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

As will be described below, a ball collection apparatus is provided which collects tennis balls in a quick manner that doesn't cause unnecessary delays and propels the collected balls to the player or to the court base line where they can then be picked up by the player before serving. Additionally, in one embodiment the ball collection apparatus is sized to contain only a single ball, therefore a compact, portable, energy efficient fast moving device is provided.

Figure 1B:
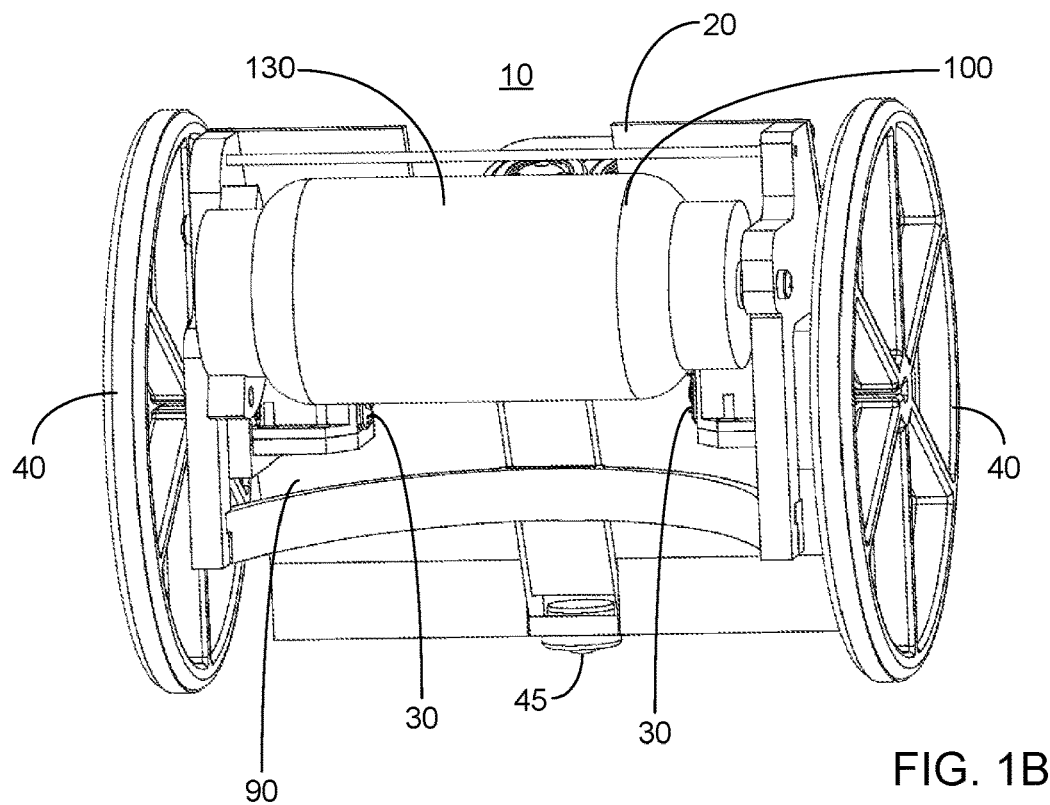
Figure 1C:
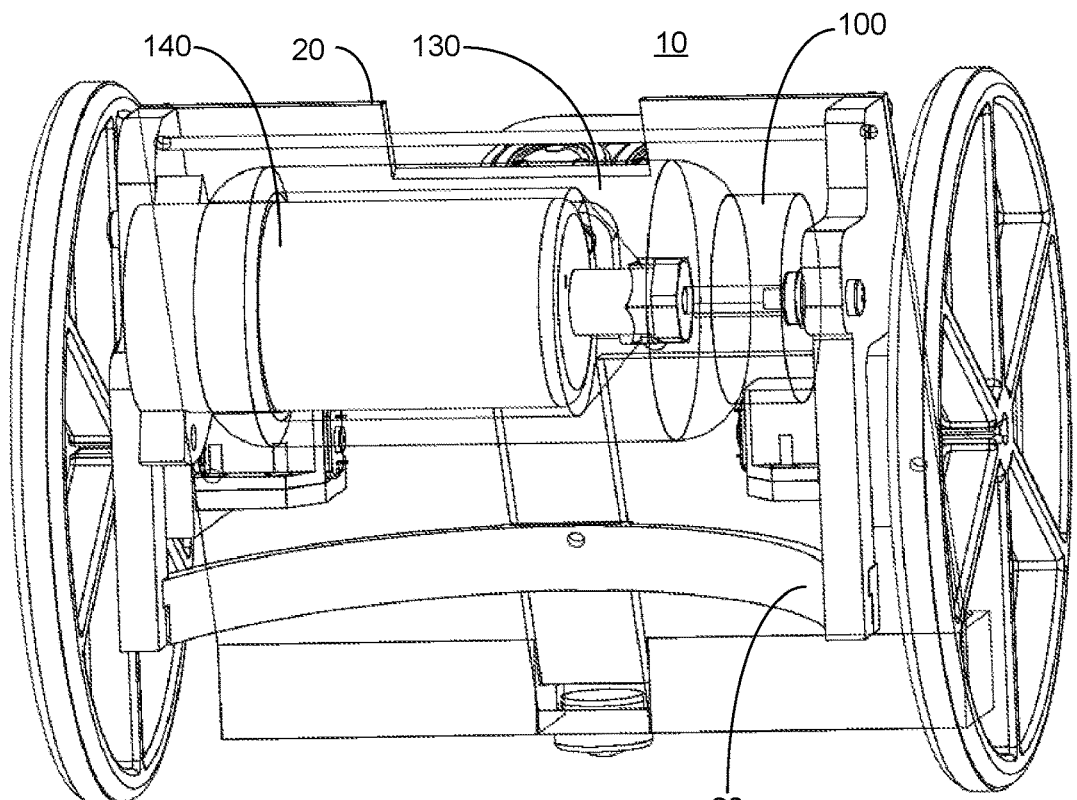
Figure 1D:
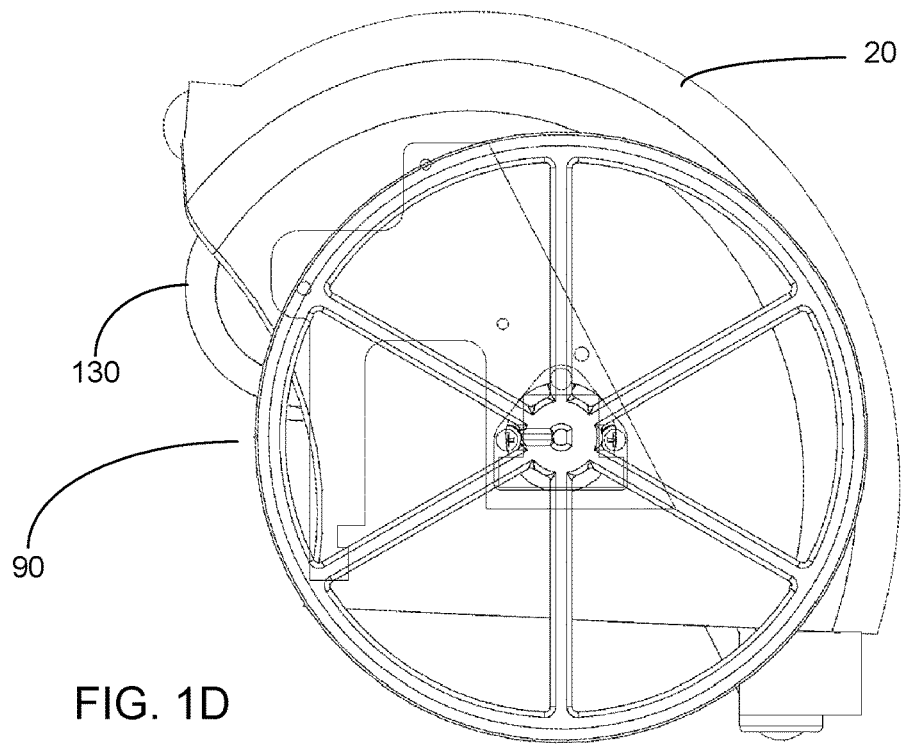
Figure 1E:
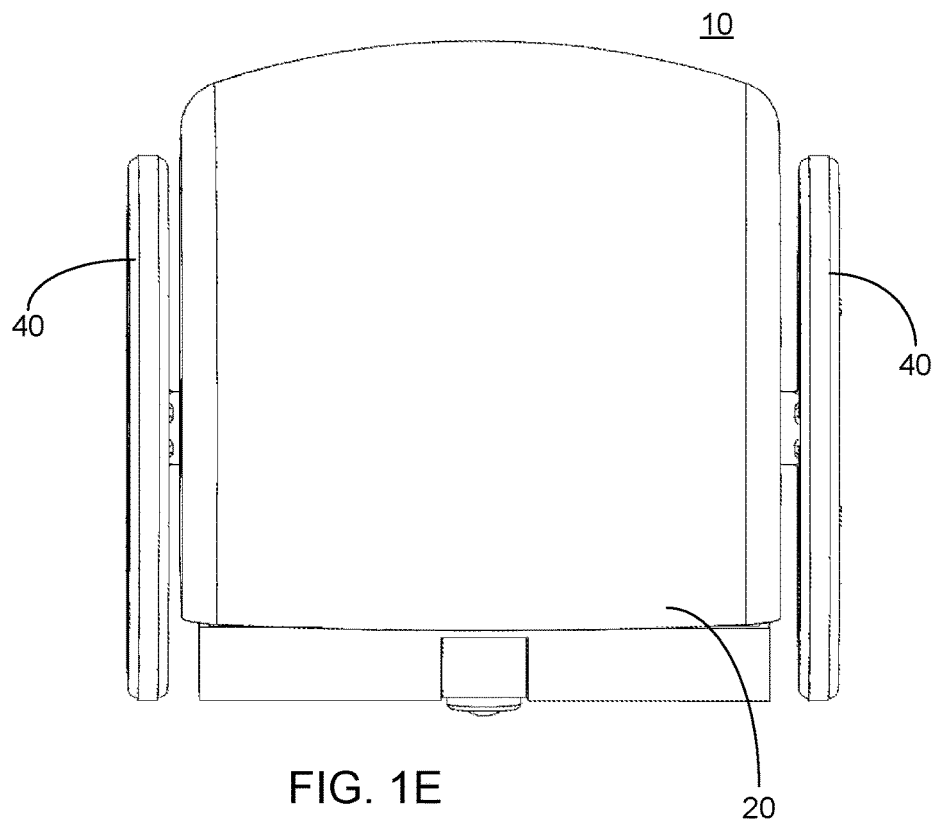
Figure 1F:
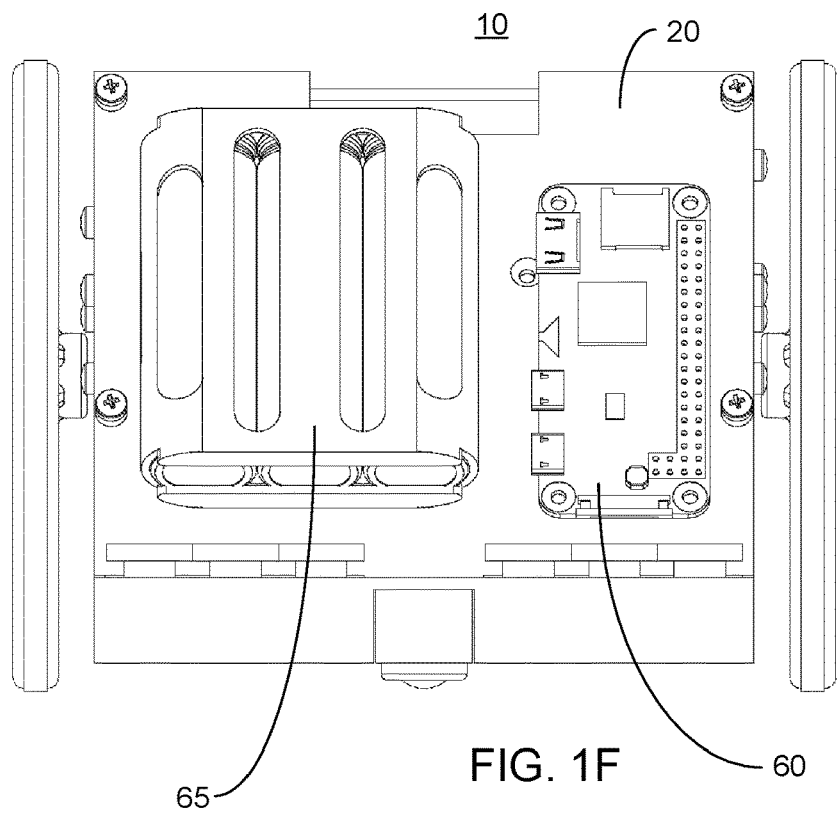
Figure 1G:
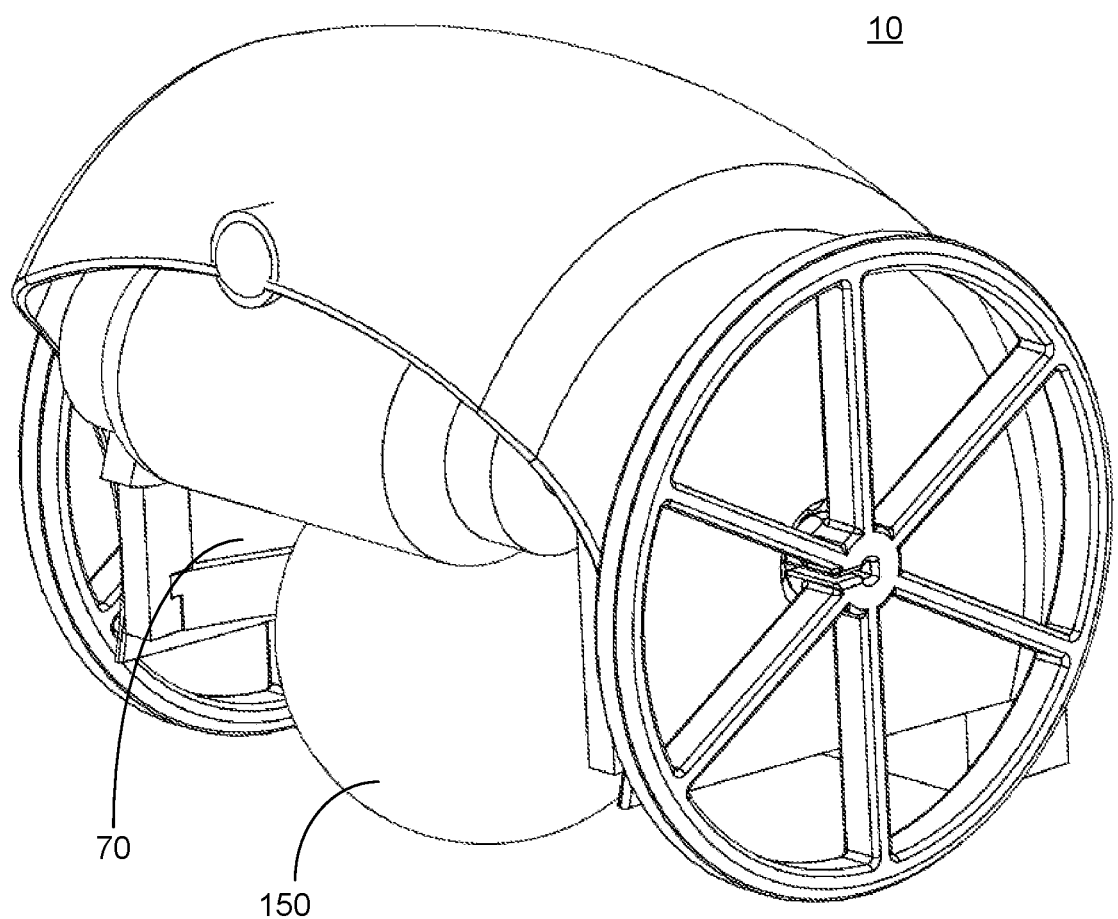

FIGS. 1A-1G illustrate various views of a ball collection apparatus 10. Ball collection apparatus 10 comprises: a body 20; a pair of motors 30; a pair of wheels 40; a control circuitry 60; a power source 65; a collection compartment 70; an optional position member 80; a ball input port 90; a ball ejector 100; and an optional imaging sensor 110. FIG. 1A illustrates a high level perspective view of ball collection apparatus 10, FIG. 1B illustrates a high level perspective view of a portion of ball collection apparatus 10, FIG. 1C illustrates the high level perspective view of FIG. 1B where ball ejector 100 is partially transparent, FIG. 1D illustrates a high level side view of ball collection apparatus 10, FIG. 1E illustrates a high level rear view of ball collection apparatus 10, FIG. 1F illustrates a high level rear view of a portion of ball collection apparatus 10 and FIG. 1G illustrates a high level perspective view of ball collection apparatus 10 with a ball 150 contained within collection compartment 70. FIGS. 1A-1G are described herein together.

Wheels 40 are positioned on either side of body 20 and each wheel 40 is mechanically coupled to a respective motor 30. Each motor 30 is in electrical communication with control circuitry 60 and power source 65 (connections not shown). Ball collection apparatus 10 is illustrated and described herein as having one motor 30 for each wheel 40, however this is not meant to be limiting in any way and in another embodiment (not shown) a single motor 30 is provided which is coupled to both wheels 40. In one embodiment, as illustrated, a generally ball shaped wheel 45 is provided in the rear of ball collection apparatus 10. Generally ball shaped wheel 45 balances ball collection apparatus 10.

In one embodiment, control circuitry 60 comprises one or more of a micro-processor, a field-programmable gate array (FPGA) or other dedicated circuitry. In another embodiment, control circuitry 60 further comprises an antenna (not shown). In one embodiment, power source 65 is rechargeable and exhibits a connection port (not shown) to a dedicated charging station.

In one embodiment, the width of collection compartment 70, between wheels 40, is sized to contain only a single tennis ball, optionally being less than 12 centimeters. In one embodiment, optional position member 80 is generally shaped as a half ellipse. Ball input port 90 is illustrated and described herein as being completely open, however this is not meant to be limiting in any way, as will be described below. Ball input port 90 is in communication with collection compartment 70, i.e. ball input port 90 is juxtaposed with collection compartment 70 and provides a path into collection compartment 70. In one embodiment, as illustrated, ball input port 90 constitutes the opening of collection compartment 70.

In one embodiment, as illustrated, ball ejector 100 comprises: a generally cylindrical shaped rotation member 130 extending horizontally across ball input port 90; and a motor 140. In one preferred embodiment, motor 140 is placed inside rotation member 130, thereby saving space and providing an easier connection between the motor rotation mechanism and rotation member 130. The distance between the bottom of rotation member 130 and the bottom of wheels 40 is optionally less than the diameter of a standard tennis ball, optionally less than 6.5 centimeters. In one embodiment, optional imaging sensor 110 comprises a camera. In another embodiment, optional imaging sensor 110 comprises additionally, or alternatively, a LIDAR sensor, or other suitable type of imaging sensor.

Motors 30 and 140 are illustrated as extending along the respective rotation axis of wheels 40 and rotation member 130, i.e. horizontally positioned motors, however this is not meant to be limiting in any way. In another embodiment (not shown), one or more of motors 30 and 140 are positioned vertically, or at any desired non-horizontal angle, and appropriate mechanisms are provided for rotation of wheels 40 and rotation member 130.

In operation, control circuitry 60 receives information regarding the location of a ball. Particularly, in one embodiment, the received information is image data received from optional imaging sensor 110 and control circuitry 60 analyzes the received image data to identify the location of the ball and other objects on the court. Specifically, optional imaging sensor 110 creates an image of a predetermined area. Control circuitry 60 then analyzes the created image to identify predetermined objects in the image. For example, control circuitry 60 analyzes the created image to identify circles or other curves and lines. Images and objects can be found in the images by any suitable image detection algorithms and techniques, such as Hough transforms and Canny edge detection techniques, without limitation. Optionally, the ball is further identified within the image by color differences, for example by identifying a yellow circle. Net poles can be identified in one embodiment by: their shape, which is vertical rising to a predetermined height and exhibiting a predetermined thickness; the color of the poles which is in one embodiment identified during an initialization phase; and their position in relation to the court lines. The net is identified in one embodiment by: color, which can be two thick white strips on the top and bottom and thin cubes in between; and position in relation to the identified net poles and court lines. Players are identified in one embodiment by the color of their clothing, optionally initially determined during the initialization stage.

Once a ball in the image is recognized, control circuitry 60 further identifies the location of the ball on the court and in relation to the location of ball collection apparatus 10. In one non-limiting embodiment, the location is identified by any of: the distance and angle of the ball location; known location of court lines, net and poles; and the known location of ball collection apparatus 10 in relation to the fixed court objects and lines.

In one embodiment, identifying the distance of the ball in relation to ball collection apparatus 10 comprises determining the size of the identified ball within the image, i.e. the number of pixels representing the ball in relation to the number of pixels within the image. The distance to the ball is then determined responsive to the identified size of the ball within the image. This is because the size of the image of the ball will increase as a function of the closeness of the ball. In one further embodiment, the horizontal diameter of the ball is measured. Alternately, or additionally, the vertical diameter of the ball is measured. Similarly, in one embodiment, the distance between the ball and one or more of the court lines, net and poles is determined from the image. The position of ball collection apparatus 10 in relation to the objects is preferably known, therefore the location of the ball in relation to ball collection apparatus 10 is further determined responsive to the determined distances between the ball and the one or more objects.

In one embodiment, imaging by optional imaging sensor 110 is continuously performed at predetermined intervals and control circuitry 60 identifies the location of the ball and the other court objects responsive to each received image. Responsive to a user command, control circuitry 60 then controls ball collection apparatus to move towards the ball, as will be described below. In one preferred embodiment, the user command is a voice command received via an acoustic sensor, such as microphone (not shown). In another embodiment, the user command is a wireless signal received from a user device such as a smartwatch or other electronic device.

Responsive to the determined location of the ball, control circuitry 60 controls motors 30 to rotate wheels 40 appropriately, thereby causing ball collection apparatus 10 to rotate by a determined angle or until the target is in the middle of the image, and advance towards the target location, i.e. the location of the ball. In another embodiment, optional imaging sensor 110 continues to collect images and control circuitry 60 identifies the ball within the collected images, as will be described below. Control circuitry 60 then adjusts the determined location of the ball responsive to the updated images and controls motors 30 responsive thereto to adjust the direction of movement of ball collection apparatus 10. In one embodiment, control circuitry 60 operates, responsive to a control feedback algorithm, to keep the target ball in the center of the image by adjustment of the movement direction of ball collection apparatus 10.

When ball collection apparatus 10 arrives at the location of the ball, control circuitry 60 maintains the operation of motors 30 until the ball has entered collection compartment 70 via ball input port 90, i.e. ball collection apparatus 10 continues to advance, optionally at a slower velocity until enclosing the ball within collection compartment 70. In one embodiment, control circuitry 60 further controls motor 140 to rotate rotation member 130 in a first rotational direction. In one preferred embodiment, the rotation of rotation member 130 starts before touching the target ball—so that rotation member 130 will already be rotating fast when it comes in contact with the target ball. This rotation of rotation member 130 pushes down on the ball and pushes the ball into collection compartment 70.

As described above, the height of the lower part of rotation member 130 is lower than the height of the ball. As a result, rotation member 130 further acts to prevent the ball from rolling out of collection compartment 70 since any movement of the ball towards ball input port 90 will be blocked by rotation member 130.

In one embodiment, a sensor is further provided within collection compartment 70 (not shown). The sensor is arranged to sense whether the ball has entered collection compartment 70. Upon detection of the ball entering collection compartment 70, control circuitry 60 begins the ejection stage, as will be described below.

Optional position member 80 maintains the ball in a predetermined position in relation to body 20. Particularly, in the embodiment where optional position member is shaped as a half ellipse, the elliptical shape maintains the ball at the apex of the ellipse when ball collection apparatus 10 is in forward motion.

Control circuitry 60 determines an ejection direction for the ball. Particularly, in one embodiment, control circuitry 60 determines the ejection direction responsive to the location of the robot on the court and a predetermined target area in the court where the ball is to be ejected to. In another embodiment, control circuitry 60 receives instructions from an external guidance system for ejecting the ball towards a predetermined target area. In another embodiment, control circuitry 60 controls optional imaging sensor 110 to supply images of the court. In one further embodiment, control circuitry 60 controls motors 30 to rotate wheels 40 such that ball collection apparatus 10 rotates by a predetermined rotation angle, up to 360 degrees, and further controls optional imaging sensor 110 to provide images of the court during the rotation. Control circuitry 60 analyzes the images to identify the court lines, net, net poles and/or the positions of the players and/or other robots, and can use this information to stop the rotation when target is in the middle of the image.

After determining the target area for the ball, which may be one of the players, the center of the base line, or another ball collection apparatus 10, control circuitry 60 controls ball ejector 100 to eject the ball from collection compartment 70 and propel the ejected ball towards the determined target area. In one non-limiting embodiment, the ball is ejected at a velocity of at least 1.5 meters per second, measured along a vector parallel to the ground, towards the determined target area. At such a speed the ball will be able to quickly cross at least half of the tennis court, from the net until after the base line. In one further embodiment, the ejection velocity is at least 2 meters per second.

In one embodiment, control circuitry 60 controls motor 140 to rotate rotation member 130 in a second direction, thereby pushing the ball out of collection compartment 70. In another embodiment, control circuitry 60 further controls motors 30 to rotate wheels 40, before rotating rotation member 130, thereby pushing the ball and providing it with an initial velocity before ejection. In further detail, wheels 40 are rotated to provide movement of ball collection apparatus 10. The movement accomplishes third goals. First, as described above, initial velocity is provided to the ball before ejection. Second, as described above, the curvature of optional position member 80 centers the ball during forward motion so that the ball will be ejected from the center of ball collection apparatus 10. Third, optional position member 80 will keep the ball away from rotation member 130 until it is time to eject the ball. For ejection, control circuitry 60 controls motors 30 to stop, or reverse direction of, the forward movement of ball collection apparatus, thereby causing the ball to advance towards rotation member 130, which is rotating, as described above. When the ball comes in contact with rotation member 130, the ball is squeezed between rotation member 130 and the ground, and propelled forward. In one embodiment, after ejection of the ball, control circuitry 60 deactivates motor 140 to cease the rotation of rotation member 130.

The above has been described in relation to an embodiment where all the images are provided by optional imagining sensor 110, however this is not meant to be limiting in any way. In another embodiment, control circuitry 60 receives the images from an external imaging system (not shown) arrayed at one or more predetermined locations in or around a tennis court.

The above has been described in relation to an embodiment where optional imaging sensor 110 continuously images the court at predetermined intervals, however this is not meant to be limiting in any way. In another embodiment, optional imaging sensor 110 only begins imaging responsive to a user command, which as described above is any of a voice command and a wireless signal. In such an embodiment, significant power is saved since images aren't constantly being produced and analyzed.

The above has been described in relation to an embodiment where ball collection apparatus 10 begins movement towards the identified ball responsive to a user command, however this is not meant to be limiting in any way. In another embodiment, optional imager 110 continuously images the court at predetermined intervals and control circuitry 60 analyzes the received images to determine a pause in the game, optionally by detecting no ball movement for greater than a predetermined time period. In one embodiment, an acoustic sensor is provided (not shown), and pause in the game is detected when no sound of a ball hitting the ground or a racket is detected for greater than the predetermined time period. Optionally, a pause is detected responsive to both the imaging information and the acoustic information, and ball collection apparatus 10 will move to collect the balls automatically without command once a pause in the game was detected.

Although the above has been described in an embodiment where ball ejector 100 comprises rotation member 130 and motor 140, this is not meant to be limiting in any way. In another embodiment (not shown), rotation member 130 is replaced with a pair of vertically positioned cylinders, one on each side of ball input port 90 and connected to a respective motor. The distance between the vertical cylinders is less than the diameter of a tennis ball. In such an embodiment, control circuitry 60 controls the respective motors to rotated the vertical cylinders which catch the ball there between and push the ball into collection compartment 70 and propels it out of collection compartment 70 when rotated in the opposite direction.

In another embodiment, no cylinders are provided. Rather, a propelling mechanism (not shown) is provided within collection compartment 70 which further provides propelling velocity to the ball. For example, a propelling rod, optionally implemented as a metal core inside a solenoid, is provided which moves forward to push the ball out of collection compartment 70. In another embodiment, the propelling rod is operated using a spring, or spring-like material, and a mechanical stopper is provided to prevent the spring from releasing until control circuitry 60 is ready for ejection of the ball. Advantageously, this further saves on energy since the spring is pushed back when the ball enters collection compartment 70 and the ejection is performed by the passive release force of the spring.

In the embodiment where no rotation members are provided at ball input port 90, the collection of the ball through ball input port 90 is optionally passive and ball collection apparatus 10 drives through the ball such that the ball enters collection compartment 70.

In one embodiment (not shown), a ramp is further provided at the bottom of ball collection apparatus 10, the ramp beginning at ball input port 90 and optionally extending into collection compartment 70. When advancing towards the ball, the ball enters collection compartment 70 via the ramp. This is a mean of storing some of the energy invested in the collection of the ball, and using it later on when propelling the ball towards the target. acceleration is provided by gravity thereby achieving a portion of the ejection speed without using any power.

Although the above has been described in relation to an embodiment where only a single ball is contained within collection compartment 70, this is not meant to be limiting in any way. In another embodiment, a plurality of balls are collected within collection compartment 70 and ball ejector 100 is arranged to eject the plurality of balls, either together or one at a time.

Advantageously, ball collection apparatus 10 thus collects tennis balls in a quick manner that doesn't cause unnecessary delays and propels the collected balls to the player or to the court line where they can then be picked up by the player before serving. Further advantageously, in the embodiment where collection compartment 70 is sized to contain only a single ball 150, as illustrated in FIG. 1G a compact, portable, energy efficient fast moving device is provided. This is made possible because ball 150 is being propelled towards the predetermined target, therefore it is not necessary to carry more than one ball 150 at a time.

Figure 2:
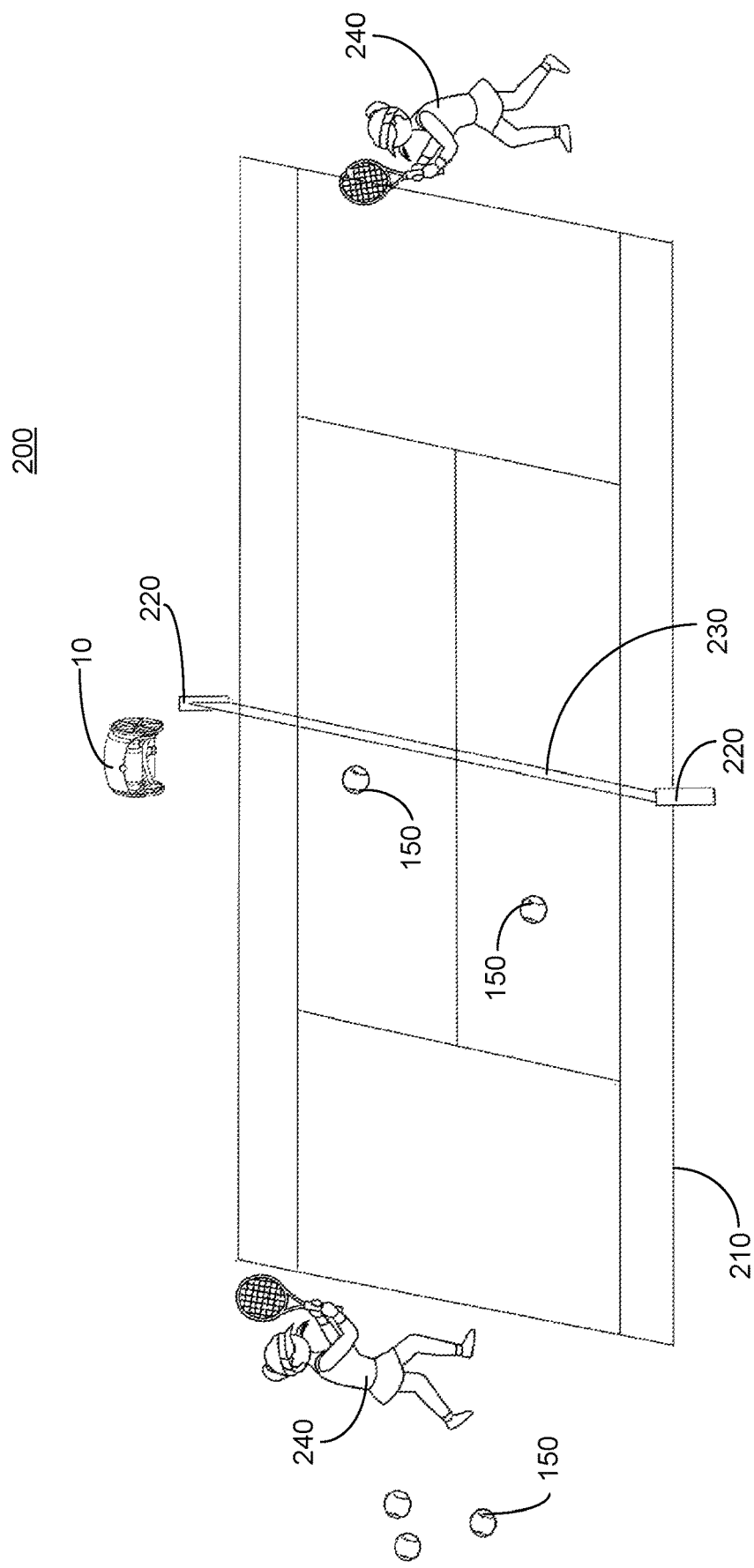
FIG. 2 illustrates a high level view of the ball collection apparatus of FIGS. 1A-1G operating on a tennis court, in accordance with certain embodiments.

FIG. 2 illustrates a high level diagram of a tennis court 200. Tennis court 200 comprises: court lines 210; net poles 220; and a net 230 extending between net poles 220. Two players 240 are illustrated, one player 240 standing on each side of net 230, however this is not meant to be limiting in any way. For example, in doubles, two players 240 play on each side of net 230. One ball collection apparatus 10 is illustrated, however this is not meant to be limiting in any way and in another embodiment a plurality of ball collection apparatuses 10 are provided. In one embodiment, ball collection apparatus 10 has a predetermined waiting position on tennis court 200. In one further embodiment (not shown), a charging station is provided at the predetermined location and the power source of ball collection apparatus 10 charges when waiting at the charging station.

As described above, ball collection apparatus 10 is arranged, optionally responsive to a user voice command, to identify the location of a ball, or balls, and advance towards the identified ball. As will be described below, in one embodiment the location of the ball is determined responsive to the distance between the identified ball and the court lines 210, net poles 220 and/or net 230 in a received image. Ball collection apparatus 10 advances and collects the ball, as described above. Additionally, ball collection apparatus 10 determines a target area for the ball, responsive to the court lines 210, net poles 220, net 230 and/or a player 240. For example, the target area can be the center of the baseline in the side of the court where the ball was picked up. Ball collection apparatus 10 then ejects the collected ball towards the determined target area. Following ejection of the ball, ball collection apparatus 10 preferably returns to a predetermined waiting position. For example, the waiting position can be outside the court, one meter from the nearest net pole in continuation with the net line.

Figure 3:
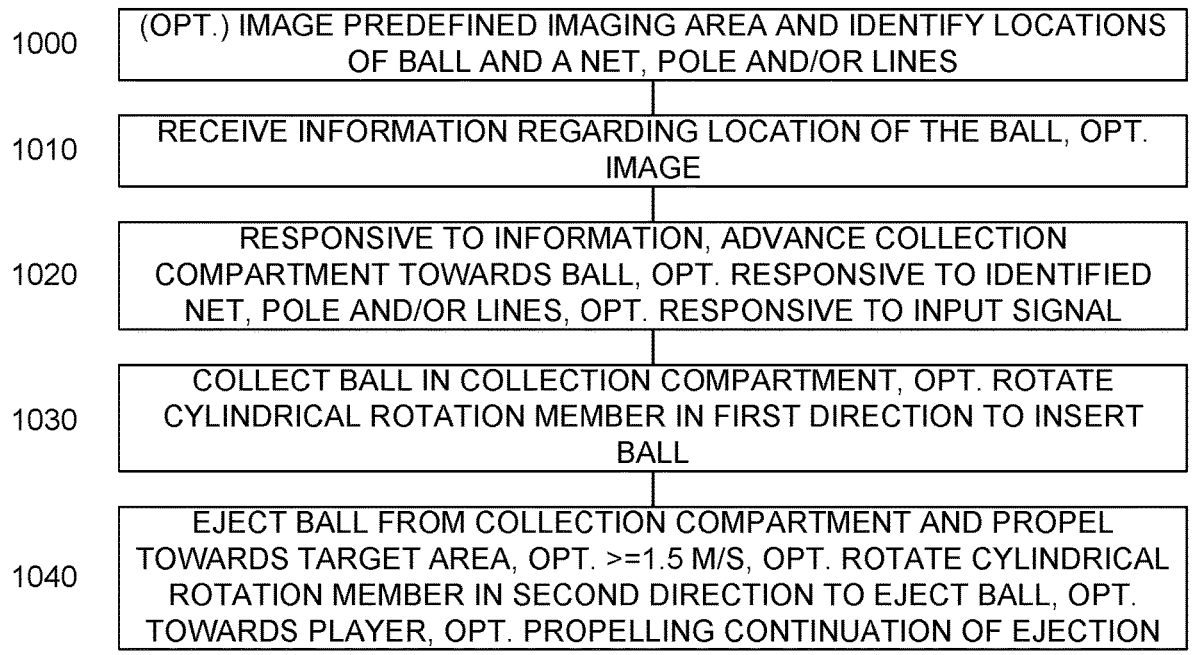
FIG. 3 illustrates a high level flow chart of a first ball collection method, in accordance with certain embodiments.

FIG. 3 illustrates a high level flow chart of a first ball collection method, in accordance with certain embodiments. In optional stage 1000, a predefined imaging area in relation to a collection compartment is imaged. In one embodiment, only one side of the court is imaged and in another embodiment both sides of the court are imaged. In one embodiment, the imaging is performed by a camera positioned on a body of a ball collection apparatus which contains the collection compartment. Additionally, the locations of a ball and one or more of a net, a net pole and a court line are identified within the imaged area.

In stage 1010, information regarding the location of the ball is received. Optionally, the information comprises the image of optional stage 1000. In stage 1020, responsive to the received information of stage 1010, the collection compartment of optional stage 1000 is advanced towards the location of the ball. Optionally, the advancement is further responsive to the identified locations of the ball and the one or more of the net, net pole and court line. Specifically, as described above, the distance to the ball and between the ball and the one or more objects are determined from the image. Responsive to the determined distances, a generally accurate location of the ball in relation to the ball collection apparatus, and/or in relation to fixed objects on the court, is determined. In one embodiment, during the advancement towards the ball, the location of the ball is periodically updated by repeated imaging and analyzation of the images, as described above. Optionally, the advancement towards the ball is initiated responsive to a received predetermined input signal, optionally a voice command.

In stage 1030, upon arrival at the location of the ball, the ball is collected within the collection compartment. Optionally, a generally cylindrical shaped rotation member is rotated in a first direction, to insert the ball in the collection compartment. Particularly, the generally cylindrical shaped rotation member applies pressure to the ball and pushes it into the collection compartment, as described above. Although in such an embodiment the ball is inserted into the collection compartment with the aid of the generally cylindrical shaped rotation member, this is not meant to be limiting such that the ball enters the collection compartment solely due to the rotation of the generally cylindrical shaped rotation member. Particularly, the collection compartment in one embodiment continues to advance over the location of the ball. Furthermore, alternate or additional mechanisms can be provided to aid the insertion of the ball within the collection compartment.

In stage 1040, the ball is ejected from the collection compartment and propelled towards a predetermined target area. In one embodiment, as described above, the predetermined target area is identified within images taken by a camera of optional stage 1000. In another embodiment, the direction of the predetermined target area is determined responsive to the distance and angle between the current position of the ball collection apparatus and the original position of the ball collection apparatus, and further responsive to the distance and angle between the original position of the ball collection apparatus and the predetermined target area. Optionally, the predetermined target area is the position of one of the players. In such an embodiment, the player is identified within the images and the ball collection apparatus is rotated until the player is in the center of images taken by the camera. The ball is then propelled towards the identified player.

Optionally, the propelling of the ball is a continuation of the ejection from the collection compartment. Particularly, the ball is ejected and the ejection force propels the ball towards the target area. In another embodiment, the ball is ejected from the collection compartment into a propelling device and the propelling device propels the ball towards the target area. Optionally, the ball is propelled towards the target area at a velocity of at least 1.5 meters/second. Optionally, the generally cylindrical shaped rotation member of stage 1030 is rotated in a second direction, opposing the first direction, to eject the ball from the collection compartment. Particularly, the generally cylindrical shaped rotation member applies pressure to the ball and pushes it out of the collection compartment, as described above. Although in such an embodiment the ball is ejected from the collection compartment with the aid of the generally cylindrical shaped rotation member, this is not meant to be limiting such that the ball exits the collection compartment solely due to the rotation of the generally cylindrical shaped rotation member. Particularly, the collection compartment in one embodiment continues to advance to provide momentum to the ball and then stops so that the ball will be ejected therefrom. Furthermore, alternate or additional mechanisms can be provided to aid the ejection of the ball from the collection compartment, as described above.

Figure 4A:
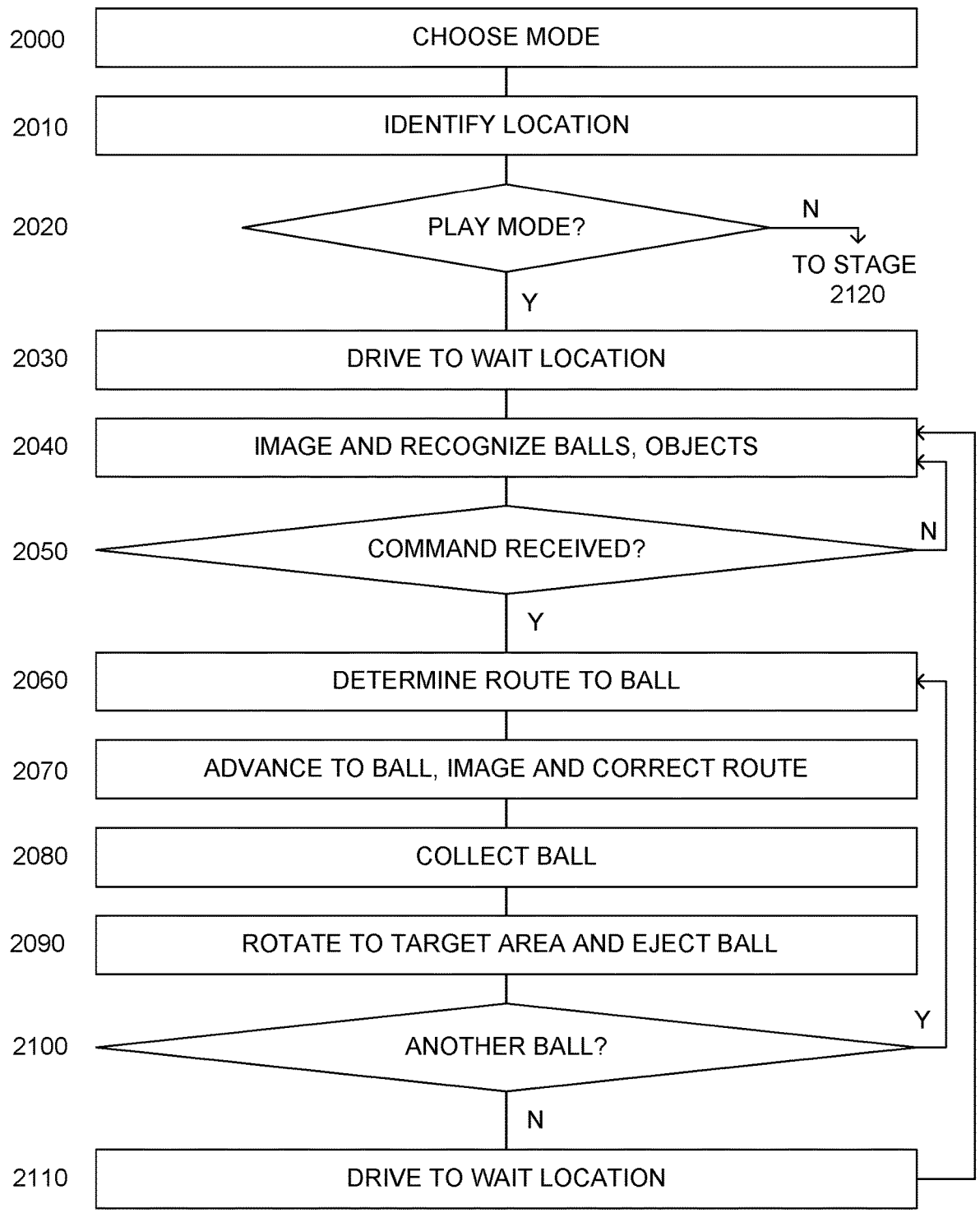
FIGS. 4A-4B illustrate a high level flow chart of a second ball collection method, in accordance with certain embodiments.
Figure 4B:
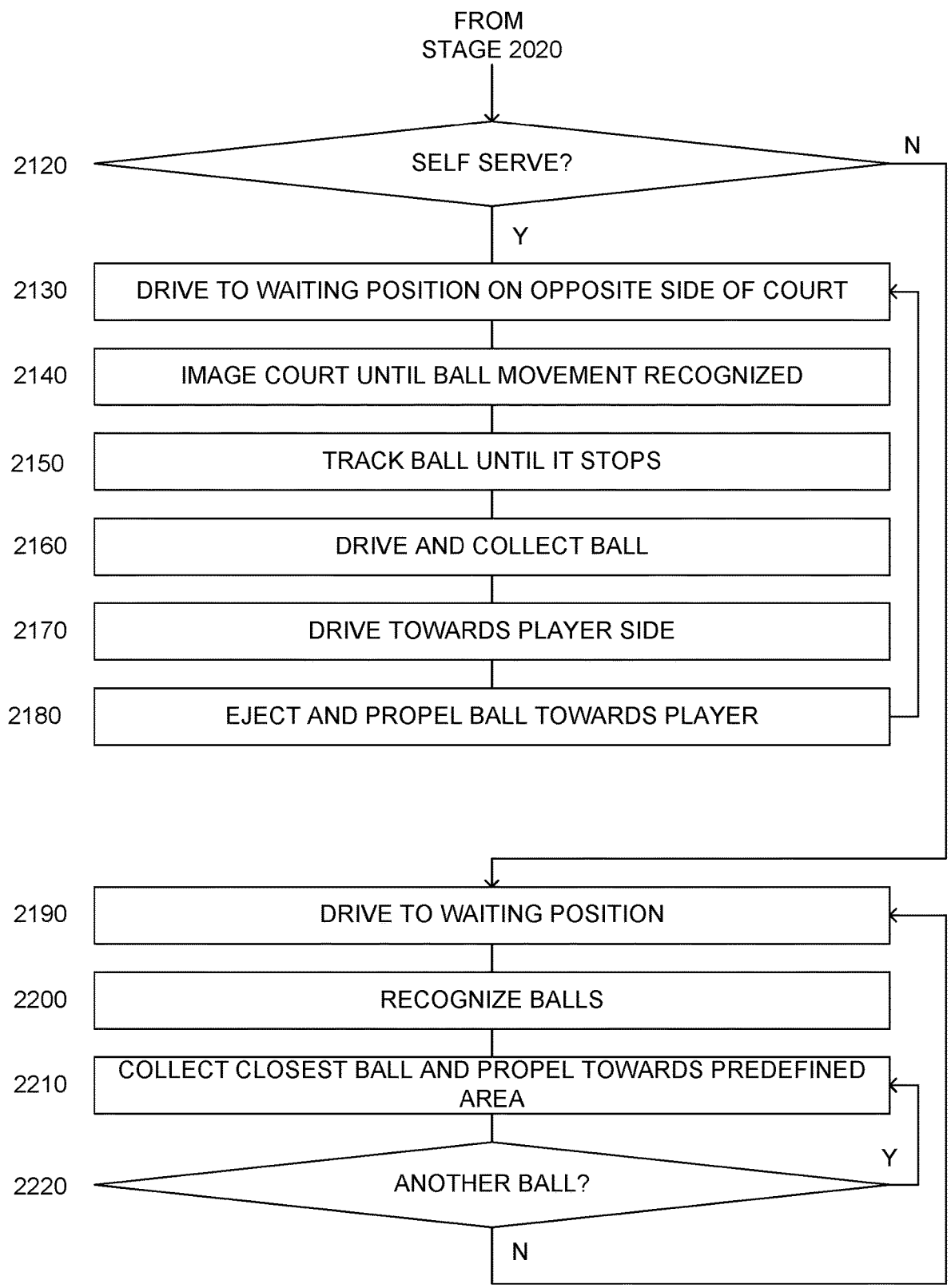

FIGS. 4A-4B illustrate a high level flow chart of a second ball collection method, in accordance with certain embodiments. In stage 2000, a player chooses a play or practice mode for a ball collection apparatus. In one embodiment, the mode is selected by a voice command. In another embodiment, the mode is selected by a wireless device or an input device on the ball collection apparatus. In stage 2010, the ball collection apparatus of stage 2000 images the surrounding area, optionally taking images 360 degrees around. The images are then analyzed and the position of the ball collection apparatus in relation to predetermined locations on the tennis court, such as net poles, is determined. In stage 2020, in the event that a play mode was selected, in stage 2030 the ball collection apparatus drives towards a predetermined waiting location, optionally near one of the net poles. In one embodiment, the play mode further comprises two options. In a first option, the ball collection apparatus is arranged to collect balls from both sides of the court. In a second option, the ball collection apparatus is arranged to collect balls from only one side of the court. In stage 2040, the ball collection apparatus images the tennis court and analyzes the images to identify the current position of the ball/balls and optionally one or more of the players, the net, the net poles and the court lines. In stage 2050, a command to collect a ball is awaited, optionally a voice command, as described above. In the absence of such a command, stage 2040 is again repeated.

Responsive to a user command to collect one or more balls, or responsive to a detected pause in the game, as described above, in stage 2060 the position of the one or more balls in relation to the ball collection apparatus, and/or in relation to fixed objects on the court, is determined and the ball collection apparatus determines in accordance with a predetermined algorithm which ball to collect first. A route to the first ball is then calculated, preferably the route being the straightest route to the ball. In stage 2070, the ball collection apparatus advances along the calculated route towards the ball. Along the route, the ball collection apparatus repeatedly takes images and updates the determined location of the ball responsive to the new image. The calculated route is then corrected in accordance with the updated determined ball location. In stage 2080, the ball is collected by the ball collection apparatus, as described above. In stage 2090, the ball collection apparatus rotates to face a target area and the ball is ejected and propelled towards the target area, as described above. In stage 2100, the ball collection apparatus determines whether another ball needs to be collected. In one embodiment, the number of balls to be collected was determined before collecting the first ball, and the determination whether another ball needs to be collected is based on the number of balls already collected. In another embodiment, after ejecting the ball, images of the tennis court are taken. In one embodiment, images are taken while the ball collection apparatus rotates 360 degrees. In another embodiment, the rotation of the ball collection apparatus is a partial rotation towards the expected location of pre-located balls, and analyzed to determine whether there are additional balls to be collected. In another embodiment, a predetermined voice command is received for looking and collecting of an additional ball.

In the event that one or more additional balls need to be collected, stage 2060, described above, is again performed. In one embodiment, in the event that a plurality of balls need to be collected, upon receiving the command of stage 2050 a route is determined for collecting all the balls. In one further embodiment, the quickest route to collect all the balls is calculated. In the event that in stage 2100 the ball collection apparatus determines that no more balls need to be collected, in stage 2110 the ball collection apparatus returns to the waiting location of stage 2030 or to another predefined waiting location that is closer to its last position.

In the event that in stage 2020 a practice mode is selected, stage 2120 is performed. In stage 2120, in the event that a self-serve mode was selected, in stage 2130 the ball collection apparatus drives to a predetermined waiting position on the opposite end of the court from where the player is serving from. In stage 2140, the ball collection apparatus repeatedly images the court until movement of a ball is identified. In stage 2150, responsive to detection of ball movement, the ball is tracked via a series of images until coming to a stop, upon which the location of the ball is determined. In one embodiment, the ball collection apparatus keeps scanning all of the half court area by rotating left/right and looking for balls. In stage 2160, the ball collection apparatus advances towards the ball and collects it, as described above. In stage 2170, the ball collection apparatus, containing the ball, drives towards the player's side of the court. When a path to the player is clear, in stage 2180 the ball collection apparatus ejects and propels the ball of stage 2160 towards the player. Another option is to drive to the side of the court and propel the ball along the side of the court towards the half court of the player. The ball will pass the net from its side and the player can then pick it up from his side instead of going all the way to the other side. Stage 2130 is then repeated. Thus, the method allows for a player to practice serving without the need to constantly go to the other side of the court to retrieve the served balls each time he runs out of balls, which is typically 3-6 balls.

In the event that in stage 2120 a training mode was selected, i.e. collecting balls during training by a coach, in stage 2190 the ball collection apparatus drives towards a predefined waiting area (for example—near the pole net, or on the far side of the court). In stage 2200, the ball collection apparatus repeatedly images the court and analyzes the images to identify balls in the pre-defined collection area, as described above. In stage 2210, the ball collection apparatus advances towards the closest identified ball, collects the ball and propels it towards a predetermined target area (such as the corner of the court), as described above. In stage 2220, the ball collection apparatus determines whether there are more balls to collect. In the event that more balls are present, stage 2210 is again performed. In the event that no more balls are present, stage 2190 is again performed. This practice mode allows clearing the court from interfering balls during practice, and for ejecting them during practice towards one area where they can be picked up when needed more quickly and easily by the coach/trainee.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A ball collection apparatus comprising:
a control circuitry;
a body;
at least one motor;
a plurality of wheels arranged to rotate responsive to said at least one motor, said body arranged to move along a surface responsive to said rotation of said plurality of wheels;
a collection compartment arranged to maintain a ball within a predetermined area in relation to said body;
a ball input port in communication with said collection compartment; and
a ball ejector arranged to eject said ball from said collection compartment, said ball ejector comprising a generally cylindrical shaped rotation member positioned within said ball input port, said generally cylindrical shaped rotation member arranged to rotate responsive to said at least one motor,
wherein said control circuitry is arranged to:
receive information regarding the location of the ball;
responsive to said received information, control said at least one motor to advance said body towards the location of the ball, said collection compartment arranged to collect the ball through said ball input port;
control said at least one motor to rotate said generally cylindrical shaped rotation member in a first direction to insert the ball into said collection compartment; and
control said ball ejector to eject said ball from said collection compartment and propel said ejected ball towards a predetermined target area, said arrangement of said control circuitry to control said ball ejector to eject said collected ball and propel said ejected ball towards the predetermined target area comprises controlling said at least one motor to rotate said generally cylindrical shaped rotation member in a second direction, said second direction opposing said first direction,
wherein said at least one motor comprises a plurality of motors, a first of said plurality of motors arranged to rotate said generally cylindrical shaped rotation member, and wherein said first of said plurality of motors is positioned within said cylindrical shaped rotation member.

2. The ball collection apparatus of claim 1, wherein said propelling of said ball is at a velocity of at least 1.5 meters/second towards the predetermined target area.

3. The ball collection apparatus of claim 1, further comprising an imaging sensor arranged to image a predefined imaging area in relation to said body, said imaging sensor secured to said body and in communication with said control circuitry, said received information comprises said image,
wherein said control circuitry is arranged to identify within said imaged area the locations of: the ball; and one of a net, a net pole, a court line and a player,
wherein said advancement towards said ball is responsive to said identified locations.

4. The ball collection apparatus of claim 1, wherein said collection compartment comprises a curved cage secured in relation to said body and arranged to drive the collected ball towards the predetermined area.

5. The ball collection apparatus of claim 1, wherein said predetermined target area is a predetermined point on a playing court.

6. The ball collection apparatus of claim 1, wherein said control circuitry is further arranged to identify the location of a player, said predetermined target area being said identified player location.

7. The ball collection apparatus of claim 1, wherein said control circuitry initiates said advancement of said body towards the location of the ball responsive to a predetermined input signal.

* * * * *